United States Patent

Estes et al.

(10) Patent No.: US 10,305,312 B2
(45) Date of Patent: May 28, 2019

(54) SUPPLEMENTAL POWER SYSTEM FOR BATTERY POWERED DEVICE

(71) Applicant: Lenovo (Singapore) Pte. Ltd., Singapore (SG)

(72) Inventors: Larry Glenn Estes, Durham, NC (US); Jeremy Robert Carlson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 74 days.

(21) Appl. No.: 15/346,316

(22) Filed: Nov. 8, 2016

(65) Prior Publication Data

US 2018/0131216 A1 May 10, 2018

(51) Int. Cl.
*H02J 7/00* (2006.01)
*H02J 7/02* (2016.01)
*H02J 50/00* (2016.01)

(52) U.S. Cl.
CPC ............ *H02J 7/025* (2013.01); *H02J 7/0021* (2013.01); *H02J 7/0036* (2013.01); *H02J 7/0055* (2013.01); *H02J 50/00* (2016.02)

(58) Field of Classification Search
CPC ................................ H02J 7/025; H02J 7/0021
USPC .................................. 320/106, 108, 137, 162
See application file for complete search history.

(56) References Cited

U.S. PATENT DOCUMENTS

| | | | | |
|---|---|---|---|---|
| 5,506,490 A * | 4/1996 | DeMuro | ............... | H02J 7/0011 320/106 |
| 6,137,265 A * | 10/2000 | Cummings | ........... | H02J 7/0004 320/133 |
| 6,324,339 B1 * | 11/2001 | Hudson | .................. | H02J 7/0011 318/499 |
| 7,259,539 B2 * | 8/2007 | Suzuki | ................... | H02J 7/0003 320/110 |
| 7,791,314 B2 * | 9/2010 | Bucur | ................... | H02J 7/0013 320/132 |
| 8,253,383 B2 * | 8/2012 | Li | ....................... | G01R 31/3658 320/134 |
| 8,400,105 B2 * | 3/2013 | Kondo | ............. | H01M 10/4257 320/108 |
| 8,633,677 B2 * | 1/2014 | Kim | ....................... | H02J 7/0031 320/134 |
| 9,172,254 B2 * | 10/2015 | Ganor | ..................... | H02J 7/0011 |
| 9,524,018 B2 * | 12/2016 | Sultenfuss | ............ | G06F 1/3296 |
| 9,583,745 B2 * | 2/2017 | White | ................. | H01M 2/1022 |
| 9,594,415 B2 * | 3/2017 | Obie | ........................ | G06F 1/266 |
| 9,726,518 B2 * | 8/2017 | Widmer | ............... | G01D 5/2006 |
| 9,912,015 B2 * | 3/2018 | O'Hora | ............... | H01M 10/425 |
| 2003/0076250 A1 * | 4/2003 | Enochson | ............. | H03M 1/004 341/120 |

(Continued)

*Primary Examiner* — M Baye Diao
(74) *Attorney, Agent, or Firm* — Ference & Associates LLC

(57) ABSTRACT

One embodiment provides a device, including: an input port; a battery pack comprising one or more battery cells; a processor; and a memory that stores instructions executable by the processor to: determine that a connected power plug supplies one or more of a current and a voltage; and thereafter provide current supply from the input port to the battery pack for charging the one or more battery cells; wherein said device operates using battery power concurrent with charging of the one or more battery cells with the current supply from the input port. Other aspects are described and claimed.

20 Claims, 6 Drawing Sheets

(56) References Cited

U.S. PATENT DOCUMENTS

| | | | |
|---|---|---|---|
| 2008/0315831 A1* | 12/2008 | Li | H02J 7/0006 320/106 |
| 2013/0026983 A1* | 1/2013 | Yamamoto | H02J 7/0055 320/108 |
| 2014/0354242 A1* | 12/2014 | Tsutsui | H02J 7/0029 320/162 |
| 2016/0020443 A1* | 1/2016 | White | H02J 7/0024 318/245 |
| 2016/0099608 A1* | 4/2016 | Jao | H02J 9/06 307/19 |
| 2016/0359350 A1* | 12/2016 | Uesugi | H02J 7/0044 |
| 2017/0033408 A1* | 2/2017 | O'Hora | H01M 10/425 |
| 2017/0179741 A1* | 6/2017 | Tian | H02J 7/0044 |

\* cited by examiner

Adapter

SUPPLEMENTAL POWER SYSTEM FOR BATTERY POWERED DEVICE

BACKGROUND

Electronic devices such as laptops and the like operate using battery power, particularly when used as a mobile device. Conventionally, a main internal battery pack, which includes one or more rechargeable battery cells, provides power to the system. Charging of the rechargeable cells of the battery pack is undertaken using an adapter that plugs into a charging port of the system.

Conventionally, for computing systems (e.g., a laptop computer) an adapter plug provides direct current (DC) input at a standard, predetermined voltage (e.g., 20V), i.e., derived from a commercial power source of alternating current (AC) such as wall power. Conventional systems must use this standard DC adapter to recharge the system. Some larger/oversized adapters have been created, whereby the adapter can supply more current into the computing system via the standard DC input port, e.g., for quick or fast charging.

When a conventional system has an adapter plugged in for charging, the device or system (e.g., laptop computer) switches to operating the system from the adapter power supply (e.g., wall power), switches out of a battery powered mode, and utilizes the excess power/current from the adapter to charge the battery. That is, the conventional system switches from battery power mode to using adapter power for the system during charging.

BRIEF SUMMARY

In summary, one aspect provides a device, comprising: an input port; a battery pack comprising one or more battery cells; a processor; and a memory that stores instructions executable by the processor to: determine that a connected power plug supplies one or more of a current and a voltage; and thereafter provide current supply from the input port to the battery pack for charging the one or more battery cells; wherein said device operates using battery power concurrent with charging of the one or more battery cells with the current supply from the input port.

Another aspect provides a method, comprising: detecting, at an input port of an electronic device, a connected power plug of an adapter; determining that the connected power plug supplies one or more of a current and a voltage; thereafter providing current supply from the input port to a battery pack of the electronic device for charging one or more cells of the battery pack; and operating the electronic device in battery powered mode concurrent with charging of the one or more cells with the current supply from the input port.

A further aspect provides a system, comprising: an adaptor comprising a wireless charging unit, an alternating current (AC) input, a direct current (DC) input port, an AC/DC adapter, a charge controller, and a DC output; and a device, comprising: an input port; a battery pack comprising one or more battery cells; a processor; and a memory that stores instructions executable by the processor to: detect, at the input port of the device, a connected power plug of the adapter; determine that the connected power plug supplies one or more of a current and a voltage; and thereafter provide current supply from the input port of the device to the battery pack for charging the one or more battery cells; wherein said device operates in battery powered mode concurrent with charging of the one or more battery cells with the current supply from the input port.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
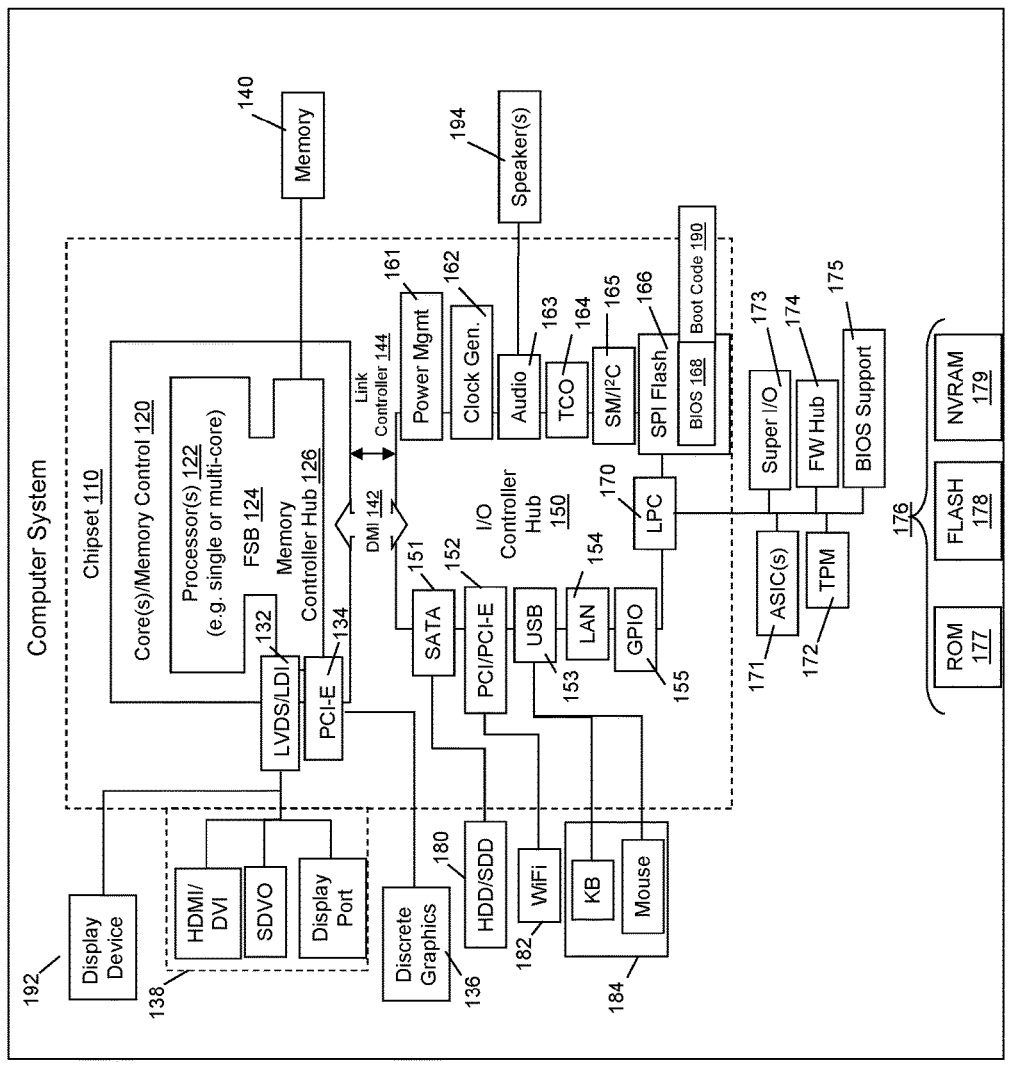
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Certain battery powered devices, e.g., a laptop personal computer (PC), will not accept power from different output power sources such as phone alternating current (AC) adapters (phone chargers), wireless chargers, power banks, etc. Typically, a PC will only accept power from a source that provides sufficient voltage and current to power the PC. The PC is thus often unable to utilize power that may be available from power sources. While some PCs may have additional input ports (i.e., other than the DC-In connector port) capable of supplying power, e.g., USB PD (power delivery) ports, some systems are not equipped with these additional ports.

An embodiment provides for a PC to utilize power from available power sources using the DC-In connector, herein "DC input port," i.e., the port designed for input of power using a predetermined (standard) AC adapter. An embodiment therefore provides a low cost method of utilizing power from a variety of power sources even on PCs that lack USB PD ports or other alternate ports and can only accept power through a standard DC input port designed to accept power from an AC adapter that typically switches the PC out of a battery power mode and into a charging mode.

Specifically, in an embodiment, input to a system for direct battery charging is provided by an adapter at battery charging voltage, with current limited to not exceed specified battery charging current (i.e., constant current, constant voltage (CCCV) type charging output). For direct battery charging, voltage and current must be limited by the charging device. Herein the charging device is referred to as an External Battery Charger (EBC) or adapter.

An embodiment provides a PC capable of utilizing power from available power sources, including phone adapters, wireless chargers, and power banks. For example, an embodiment provides for the PC to accept power from an EBC/adapter. An EBC/adapter is an external device that outputs battery charge voltage and current of a predetermined type that is recognizable by the system, e.g., as compared to AC derived wall power.

In an embodiment, the PC is configured to recognize that the adapter is connected to the DC input port. This may be done through an ID pin(s), using active communication or by setting a voltage level (and comparing the resistance offered by the adapter to known resistances). Other mechanisms of identifying the adapter may also be employed.

Further, when PC detects the adapter with direct battery charging output, the PC continues to operate on battery power (operates in battery power mode) and turns on a direct current path from the DC input port to the battery (e.g., using FETs). Optionally, depending on the adapter's output capability and control, the PC may communicate to the adapter a desired battery charging voltage and current. This communication can be accomplished through the ID pin(s) interface of the DC input port or by any other communication mechanism, e.g., a wireless communication such as BLUETOOTH wireless communication. BLUETOOTH is a registered trademark of BLUETOOTH SIG, Inc. in the United States and other countries.

In an embodiment, the adapter is capable of providing battery charging voltage and current suitable for charging the PC battery. Output of the adapter is connected to the PC's DC input port. The adapter in turn is capable of accepting input power from a variety of power input sources according to an embodiment. These power input sources may include phone AC adapters, USB power adapters, wireless chargers, phone power banks, etc. An embodiment utilizes a buck/boost battery charger, e.g., implemented in the adapter, to convert the DC inputs of the power input sources to the battery charging voltage/current required by the PC. Thus, the adapter charges PC battery while the PC continues to operate on (PC) battery power.

Some possible product implementations for the adapter include providing an AC adapter with multi-function power adapter features, e.g., wireless charging capability, input port for phone AC adapters, etc. Thus, in an embodiment the adapter may operate as a standard AC adapter (pass through) when AC power is connected to the adapter, whereas the adapter operates as an alternative power input source when other power sources are connected thereto.

For example, the adapter may include a USB input port (e.g., standard USB input port, mini USB input port, and/or a micro USB input port) to accept power from power adapters/power banks with USB power outputs. As another example, the adapter may include a wireless charging receiver (e.g., supporting one or more wireless charging protocols/standards). For example, a tri-mode wireless charging receiver may be incorporated into the adapter in an embodiment.

In an embodiment, the adapter may have an integrated power bank. As with other examples, the adapter may include input ports (e.g., various types of USB input ports) to accept power from power adapters with USB power outputs and/or wireless charging receiver (supporting one or more wireless charging protocols/standards).

The illustrated example embodiments will be best understood by reference to the figures. The following description is intended only by way of example, and simply illustrates certain example embodiments.

FIG. 1 depicts a block diagram of an example of battery powered device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 110 includes a core and memory control group 120 and an I/O controller hub 150 that exchanges information (for example, data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture. One or more processors 122 comprise internal arithmetic units, registers, cache memory, busses, I/O ports, etc., as is well known in the art.

In FIG. 1, the memory controller hub 126 interfaces with memory 140 (for example, to provide support for a type of RAM that may be referred to as "system memory" or "memory"). The memory controller hub 126 further includes a low voltage differential signaling (LVDS) interface 132 for a display device 192 (for example, a CRT, a flat panel, touch screen, etc.). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, etc., 180), a PCI-E interface 152 (for example, for wireless connections 182), a USB interface 153 (for example, for devices 184 such as a digitizer, keyboard, mice, cameras, phones, microphones, storage, other connected devices, etc.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Device circuitry, as for example outlined in FIG. 1, may be used in devices such as a PC and/or other electronic devices that operate using power supplied form an internal battery pack comprising one or more battery cells. For example, the circuitry outlined in FIG. 1 may be implemented in laptop computing device.

Referring now to FIG. 2(A-B) an adapter and system (e.g., PC) according to an embodiment are illustrated.

Figure 2A:
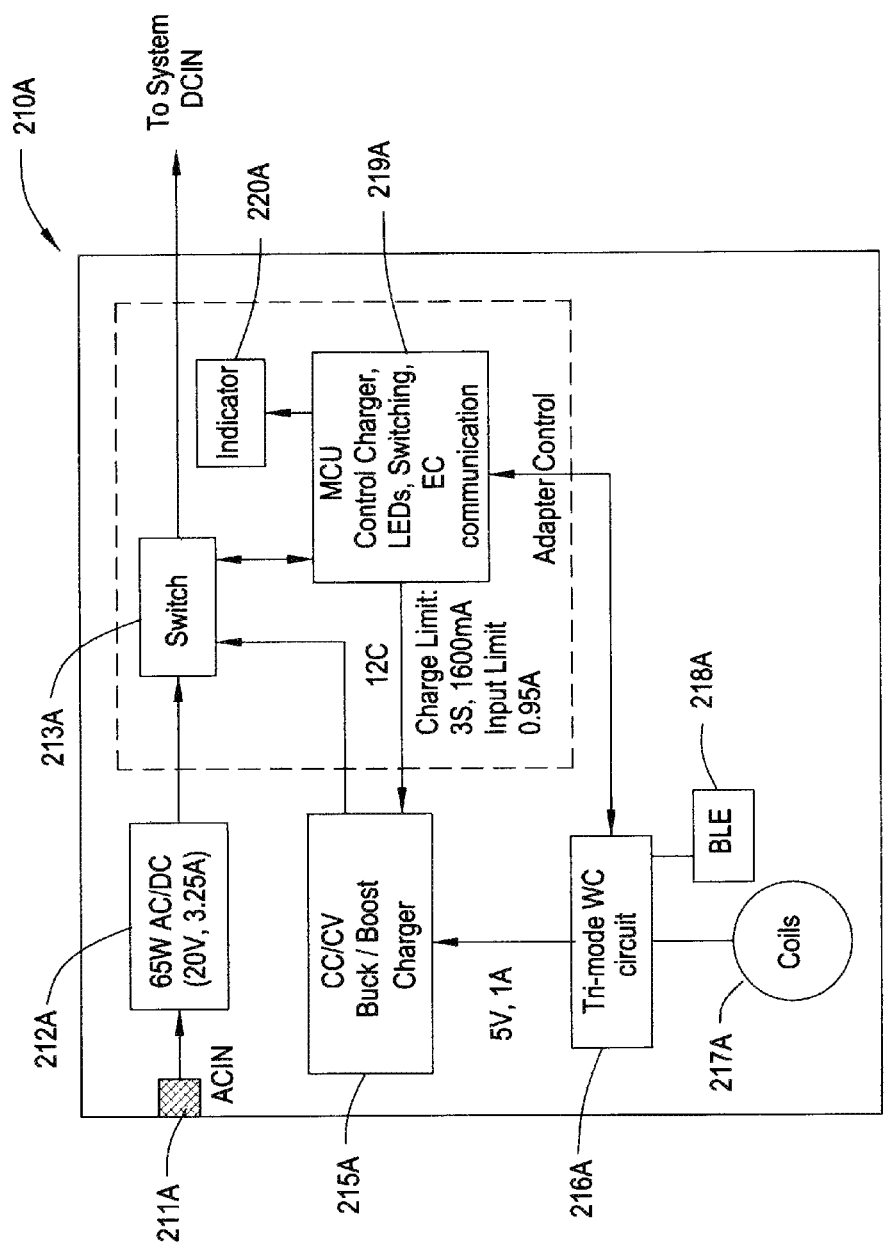
FIG. 2(A-B) illustrates an example of an adapter and battery powered device.

In FIG. 2A, an adapter 210a is shown that includes an AC input port 211a as well as an AC/DC converter 212a, which may provide power (e.g., wall power) to the system (PC) in a pass through mode if such AC power source is available.

Additionally, adapter 210a includes charging coils 217 for accepting wireless charging power that is routed through a circuit 216a, e.g., tri-mode wireless circuit as illustrated in the non-limiting example of FIG. 2A. The output of the circuit 216a may be provided to a buck/boost converter 215 to increase the output voltage to a level more suitable for the PC (dictated by the PC battery cells to be charged). A switch 213a is provided in the adapter 210a in order to appropriately route power from one of the power sources available, e.g., AC—in power 211a or wireless power from the coils 217a.

Although not illustrated in FIG. 2A, an adapter 210a may include an input port for other power sources, e.g., a USB port for an AC phone charger. Additionally, an adapter 210a may include an integrated battery or power bank. Each power source (i.e., those not derived from AC-input port 211a) may be routed through the buck/boost converter 215a for appropriate power conditioning prior to output to the system (PC). An indicator 220a may be provided to indicate which, if any, power source is being utilized by the adapter 210a of if any power source is being supplied generally.

Figure 2B:
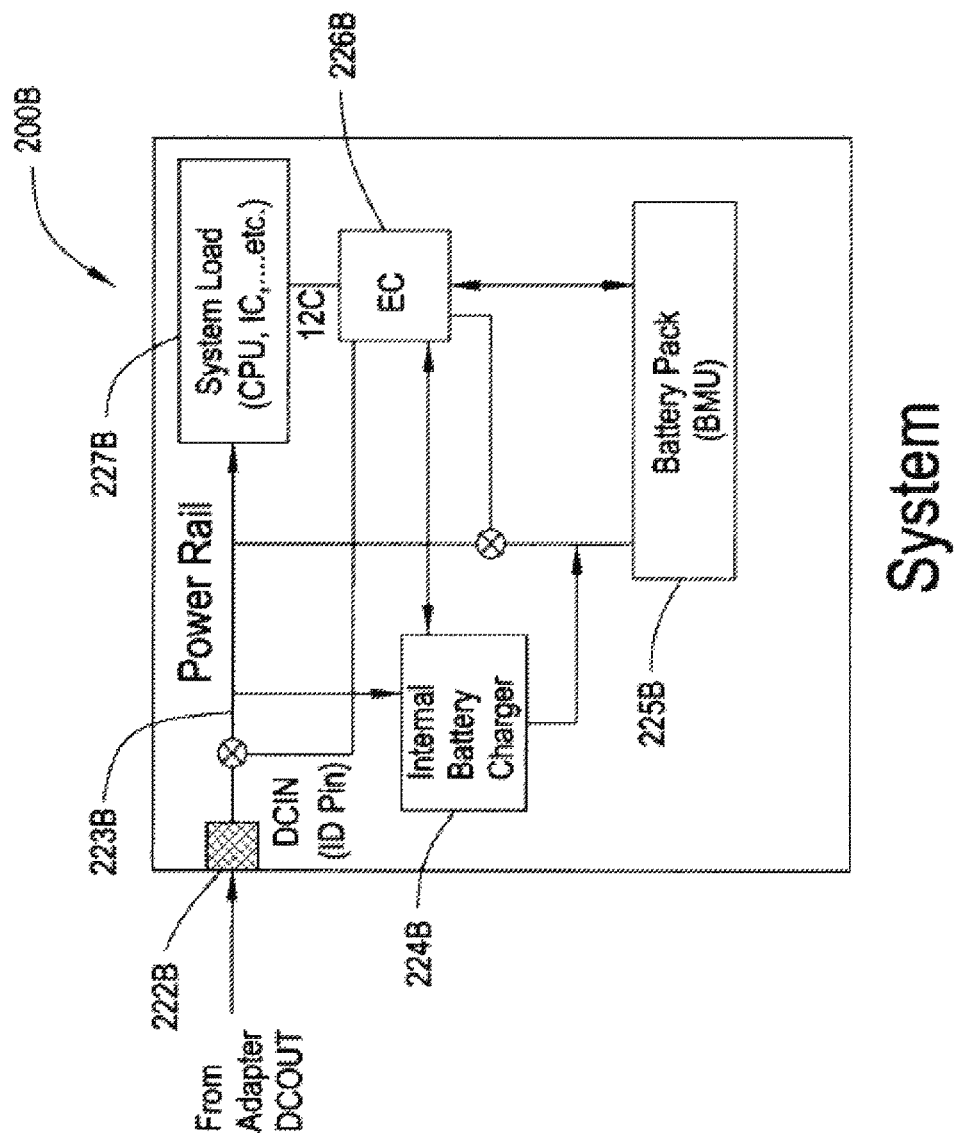

FIG. 2B illustrates components of a system (PC) 200b according to an embodiment. As illustrated the system 200b includes a DC input port 222b that accepts power input from a plug of the adapter 210a. The DC input port 222b provides power to a power rail 223b and, e.g., if AC derived power (e.g., 20V wall derived power) is available from the adapter, to the system load 227b.

Additionally, the system 200b includes an internal battery charger 224b that, e.g., if AC derived power (e.g., 20V wall derived power) is available from the adapter, provides power to the battery pack 225b. In such a case, the embedded controller 226b operates the system 200b in an AC power mode, i.e., switches the system 200b to run on the AC derived power (e.g., 20V DC-in power) and charges the battery pack 225b at the same time.

However, as further described herein, the DC input port 222b includes an ID pin that may be used to identify the type of power being provided by the adapter. For example, the ID pin of the DC input port 222b may be used to determine that the adapter is providing power from another power source, e.g., a wireless charging source. In an embodiment, this determination may be accomplished via identifying the adapter using the DC input port 222b, and specifically the ID pin thereof, to identify the adapter as a certain type. Further, an embodiment may communicate directly with the adapter, e.g., utilizing a communication between the PC and the adapter, e.g., via the ID pin and/or via wireless module 218a provided in the adapter 210a and like communication module provided on the PC. In the example of FIG. 2A, the wireless communication is provided by BLUETOOTH LE (BLE). By way of specific example, BLE module indicated at 218a may be used to communicate with a wireless charging transmitter (PTU) (part of tri-mode WC charging circuit 216A) when operating in tri-mode wireless charging.

If the adapter 210a offers power from a power source such as a wireless charging source, a phone AC adapter, etc., this power may not be sufficient to power the system 200b proper, e.g., may be insufficient to support the system load 227b, but may nonetheless be routed through to the battery pack 225b for supplemental charging.

Thus, an embodiment provides for charging of the battery pack 225b with a variety of power DC inputs. In an embodiment, the DC input form the alternative power sources is routed directly to the battery pack 225b, as illustrated in FIG. 2B (although this is not a requirement). In an embodiment, the embedded controller 226b operates switches to send the power from the DC input port 222b to the battery pack 225b directly.

Figure 3:
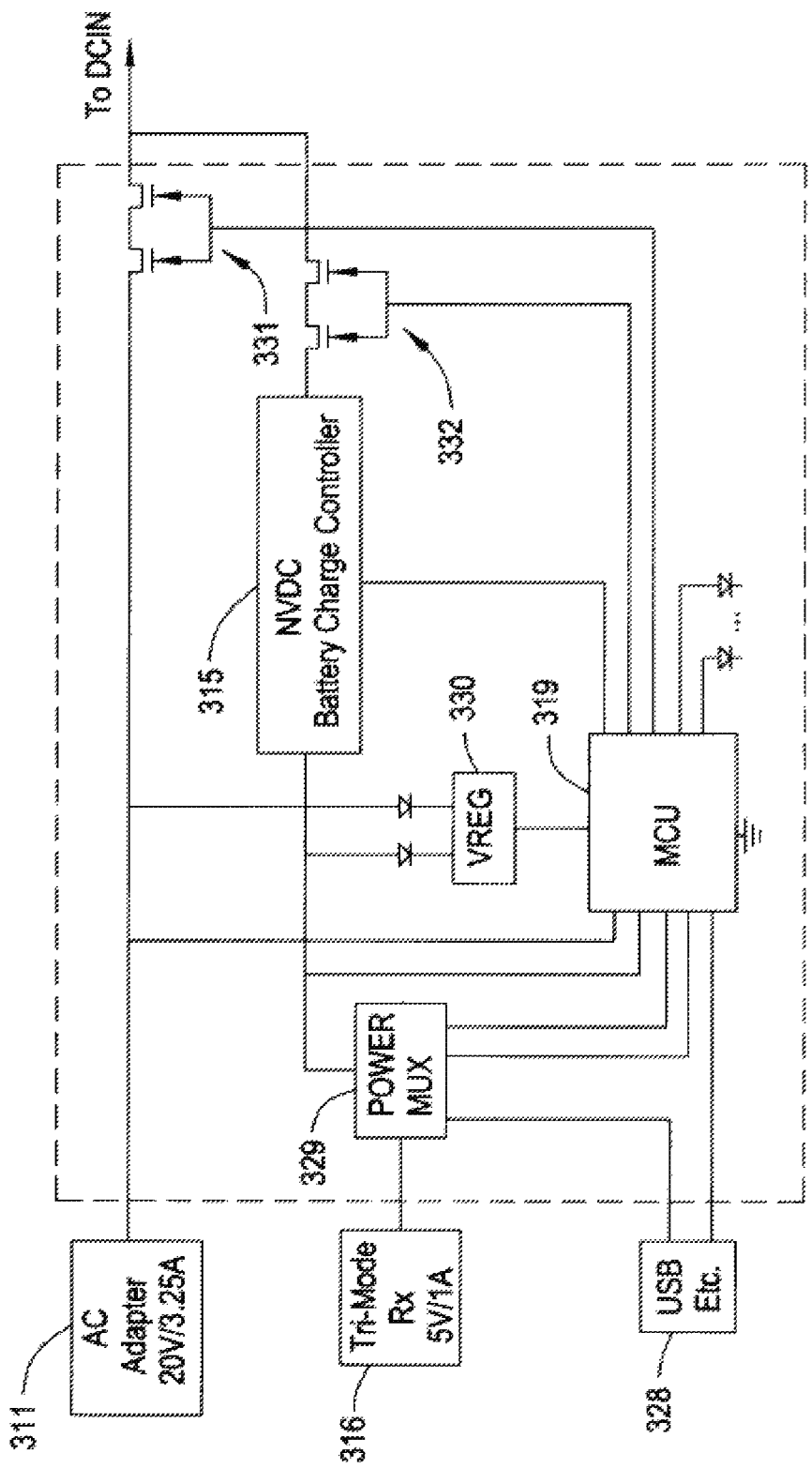
FIG. 3 illustrates an example block diagram of adapter components.

Referring to FIG. 3, an example of adapter components is illustrated according to an embodiment. As shown, the adapter may include components for accepting inputs from various power sources including (but not necessarily limited to) an AC adapter 311, a tri-mode wireless receiver 316 and/or a USB input port 328. The power sources, e.g., provided through the tri-mode wireless receiver 316 and the USB input port 328, may be selected using power MUX 329 and provided to a power boosting unit, here illustrated as NVDC battery charge controller (e.g., Intersil ISL9237 Buck-boost Narrow VDC Battery Charger) 315.

In the adapter, a microcontroller (MCU) 319 detects power inputs from the various sources (here, AC adapter 311, tri-mode receiver 316, and/or USB port) routed through voltage regulator 330 and operates switches 331, 332 (as well as power mux 329, if needed) to appropriately select the output to provide to the plug of the adapter (and thus to the system/PC).

Figure 4:
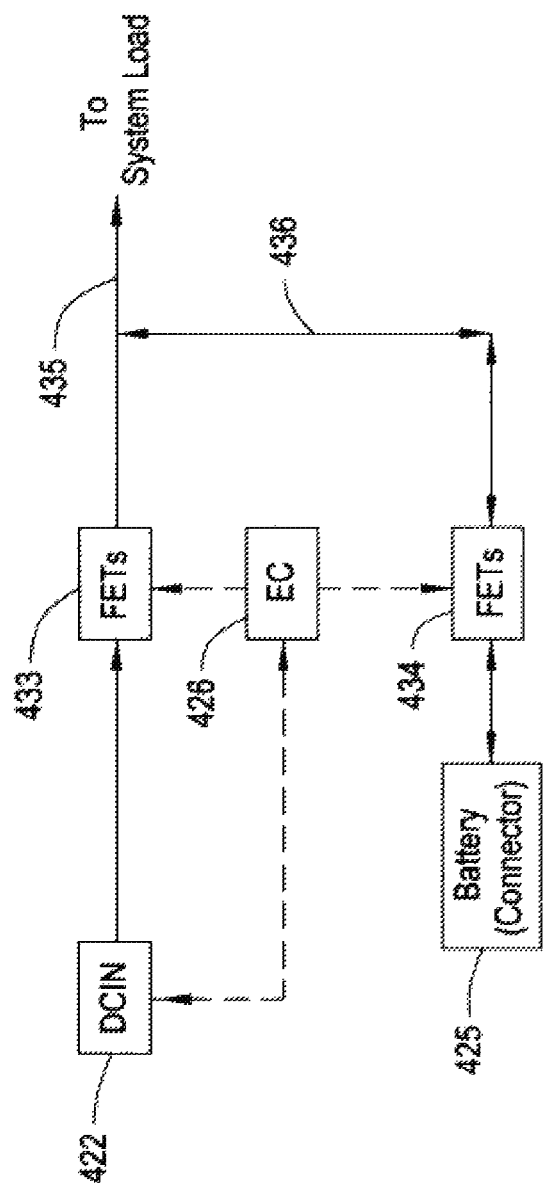
FIG. 4 illustrates an example block diagram of battery powered device components.

On the system (PC) side, as illustrated in FIG. 4, a DC input port 422 accepts power from the adapter plug. The power is routed appropriately given its characteristics, e.g., predetermined (standard) input (e.g., 20V DC input) versus other power source voltage and/or current. As illustrated, FETs 433, 434 (only two are illustrated for simplicity) may be utilized to either route the DC input power along rail 435 directly to the system load (e.g., in an AC mode, noting that battery charging will also be implemented (not explicitly illustrated in FIG. 4; reference may be made to FIG. 2B)). Alternatively, e.g., by turning all FETs on, the embedded controller 426 may route an input power to the battery 425 directly rather than to the system load. In such a case, the power flows from the DC input port 422 along rail 435 and along rail 436.

In an embodiment, the power source is provided to the battery 425 while the system (PC) continues to operate on battery power, i.e., power flows from battery 425 to the system load along rails 435, 436. Any excess power, i.e., current not required by the system load (e.g., processor, memory, etc.), will be routed from the DC input port 422 to the battery 425 using rail 436. This permits the PC to continue to operate using battery power while supplementing the battery 425 by charging with excess power provided by a DC input, e.g., derived from a wireless charging system, USB input, etc.

Figure 5:
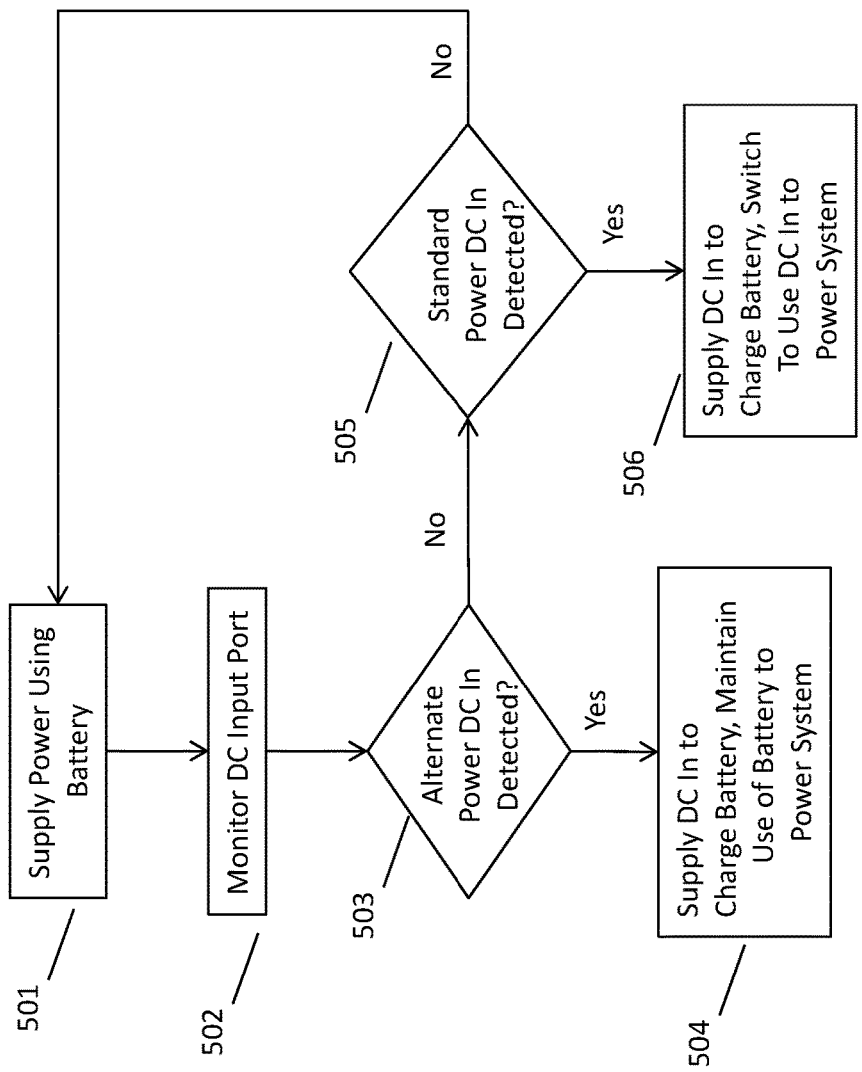
FIG. 5 illustrates an example method of charging a battery powered device using an adapter.

As shown in FIG. 5, an embodiment will therefore route power from a power source, through the standard DC input port, to charge the battery. By way of specific example, a supply of power using the battery is maintained by the system at 501, i.e., the PC is operating on battery power supplied by cells of an internal battery pack. An embodiment monitors the DC input port at 502, e.g., for supply of DC-in power from an adapter plug, as described herein.

If a power source of a particular voltage and/or current at the DC-in is detected at 503, an embodiment routes that power supply from the DC input port to the battery (directly) and maintains the use of the PC internal battery pack to power the system, as shown at 504. However, if the DC input power is a high/standard DC power input (e.g., 20V), as determined at 505, an embodiment routes that power to the system load and utilizes the power to charge the batteries of the PC, as illustrated at 506. Thus, the PC switches out of battery powered mode. If no DC power input is detected, the system continues to operate on internal battery power, as illustrated.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices, through wireless connections, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, comprising:
   an input port;
   a battery pack comprising one or more battery cells;
   a processor; and
   a memory that stores instructions executable by the processor to:
   determine a power plug of an adapter is connected to the input port and supplies one or more of a current and a voltage, wherein the adapter comprises, a wireless charging unit, an alternating current (AC) input, a direct current (DC) input port, an AC/DC converter, a charge controller, and a DC output; and
   thereafter provide current supply from the input port to the battery pack for charging the one or more battery cells;
   wherein said device operates using battery power concurrent with charging of the one or more battery cells with the current supply from the input port.

2. The device of claim 1, wherein the adapter comprises a power supply selected from the group consisting of a wireless power supply and an external battery charger.

3. The device of claim 1, further comprising an embedded controller that switches a plurality of switches to provide the current supply from the input port to the battery pack for charging the one or more battery cells.

4. The device of claim 3, wherein the plurality of switches comprise a plurality of field effect transistors (FETs).

5. The device of claim 1, wherein the current supply from the input port is provided directly to a battery pack for charging the one or more battery cells.

6. The device of claim 1, wherein the device determines that the connected power plug supplies one or more of a current and a voltage by utilizing a pin of the input port.

7. The device of claim 1, further comprising a wireless communication device, wherein said wireless communication device communicates with the adapter plugged into the input port.

8. The device of claim 7, wherein the device communicates with the adapter to identify a power input characteristic of the adapter.

9. The device of claim 7, wherein the device communicates with the adapter to request a power input from the adapter.

10. The device of claim 1, wherein the processor determines that the input port supplies one or more of a current and a voltage by identifying the adapter plugged into the input port.

11. The device of claim 10, wherein the device communicates with the adapter plugged into the input port to identify the adapter.

12. A method, comprising:
    detecting, at an input port of an electronic device, a connected power plug of an adapter;
    determining the power plug of an adapter is connected to the input port and supplies one or more of a current and a voltage, wherein the adapter comprises, a wireless charging unit, an alternating current (AC) input, a direct current (DC) input port, an AC/DC converter, a charge controller, and a DC output;
    thereafter providing current supply from the input port to a battery pack of the electronic device for charging one or more cells of the battery pack; and
    operating the electronic device in battery powered mode concurrent with charging of the one or more cells with the current supply from the input port.

13. The method of claim 12, wherein the adapter comprises a power supply selected from the group consisting of a wireless power supply and an external battery charger.

14. The method of claim 12, further comprising switching, with an embedded controller of the electronic device, a plurality of switches to provide the current supply from the input port to the battery pack for charging the one or more cells.

15. The method of claim 12, wherein the current supply from the input port is provided directly to a battery pack for charging the one or more cells.

16. The method of claim 12, further comprising determining that the connected power plug supplies one or more of a current and a voltage by utilizing a pin of the input port.

17. The method of claim 12, further comprising communicating, with a wireless communication device of the electronic device, with the adapter plugged into the input port.

18. The method of claim 17, wherein the communicating comprises communicating with the adapter to identify a power input characteristic of the adapter.

19. The method of claim 17, wherein the communicating comprises communicating with the adapter to request a power input from the adapter.

20. A system, comprising:
    an adapter comprising a wireless charging unit, an alternating current (AC) input, a direct current (DC) input port, an AC/DC converter, a charge controller, and a DC output; and
    a device, comprising:
    an input port;
    a battery pack comprising one or more battery cells;
    a processor; and
    a memory that stores instructions executable by the processor to:
    detect, at the input port of the device, a connected power plug of the adapter;
    determine that the connected power plug supplies one or more of a current and a voltage; and
    thereafter provide current supply from the input port of the device to the battery pack for charging the one or more battery cells;
    wherein said device operates in battery powered mode concurrent with charging of the one or more battery cells with the current supply from the input port.

* * * * *